United States Patent [19]

Sullivan

[11] 4,392,592
[45] Jul. 12, 1983

[54] FOOD DISPENSING GUN

[76] Inventor: Norman D. Sullivan, 251 Donald Dr., Hollister, Calif. 95023

[21] Appl. No.: 181,773

[22] Filed: Aug. 27, 1980

[51] Int. Cl.³ ............................................. G01F 11/02
[52] U.S. Cl. .................................. 222/288; 222/309; 222/324; 222/334
[58] Field of Search ............... 222/263, 288, 309, 323, 222/324, 334, 372, 381; 239/332

[56] References Cited

U.S. PATENT DOCUMENTS

| | | | |
|---|---|---|---|
| 1,965,038 | 7/1934 | Hartman | 222/334 X |
| 2,941,726 | 6/1960 | Szczepanski | 239/332 X |
| 3,198,439 | 8/1965 | McNinch, Jr. et al. | 222/334 X |
| 3,203,595 | 8/1965 | Berkowitz . | |
| 3,830,410 | 8/1974 | Magrath et al. | 222/309 |
| 3,963,061 | 6/1976 | Kenney . | |
| 4,006,847 | 2/1977 | Dooley | 222/263 |
| 4,032,044 | 6/1977 | Flynn et al. . | |
| 4,124,147 | 11/1978 | Priese et al. . | |

Primary Examiner—Robert B. Reeves
Assistant Examiner—Edward M. Wacyra
Attorney, Agent, or Firm—Claude A. S. Hamrick

[57] ABSTRACT

A charge of a condiment such as catsup, mustard or a similar sauce is delivered from a bulk-storage container to a chamber at the end of an air-actuated gun. When the trigger of the gun is actuated to force a piston along the chamber, the charge of condiment is ejected from the gun. When the trigger is released, the piston is retracted toward the rear of the chamber and a new charge of condiment is moved into the chamber under a small amount of pressure from the bulk storage container to a position in front of the piston.

7 Claims, 5 Drawing Figures

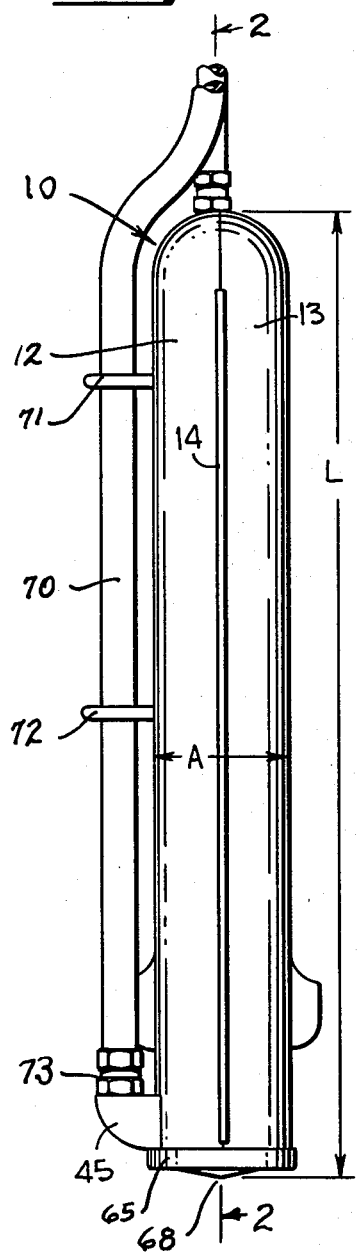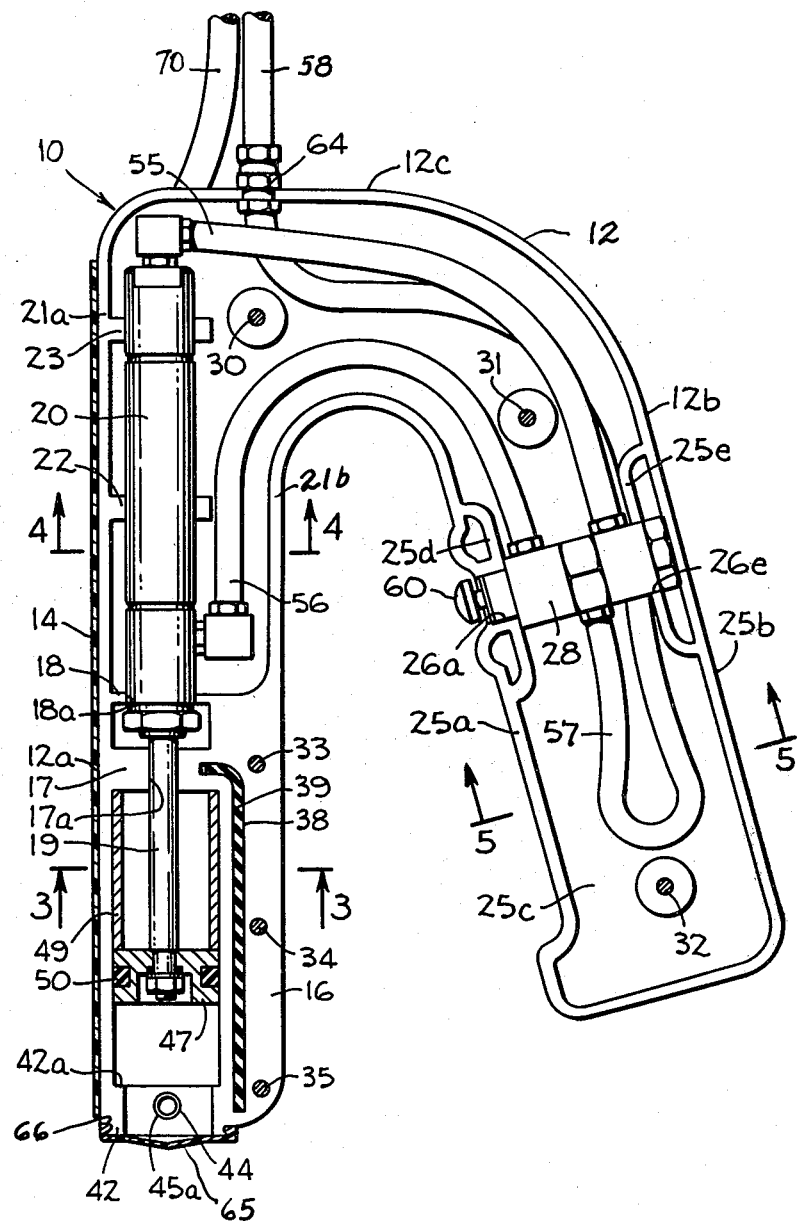

FOOD DISPENSING GUN

BACKGROUND OF THE INVENTION

In fast food restaurants it is often necessary to make a large number of sandwiches and the like quickly enough to accommodate a large number of customers during busy intervals and to prepare for anticipated demand. Not only must this operation be accomplished rapidly with relatively untrained help, but also the sandwiches must have a reasonably attractive final appearance and, for economic reasons, material such as catsup and other condiments should not be wasted. In many restaurants today the condiments are dispensed from a squeezable container wherein the amount of material discharged depends upon the duration and vigor of the squeeze applied by the operator. Accordingly, with untrained, partially-trained, or careless help a great deal of condiment can be wasted during any operating period while the sandwiches will still not have an appealing appearance to the customer. Accordingly, there is a need for a condiment dispensing device that will effectively dispense a predetermined amount of condiment and one that is particularly usable in a controlled manner by even inexperienced operators.

In the past, dispensing devices have been disclosed, such as that in U.S. Pat. Nos. 4,032,044 and 4,124,147 wherein flexible diaphragms are used to eject charges of material from a dispensing unit, and that in U.S. Pat. No. 3,203,595 wherein special control means are used to control discharges of two different condiments.

SUMMARY OF THE INVENTION

The condiment dispensing device of the invention comprises a housing having a metering chamber therein, a power-actuated mechanism in the housing for ejecting a charge of condiment from the chamber, and means for delivering condiment to the chamber between actuations of the ejecting mechanism. In the preferred embodiment, the device is made of relatively inexpensive-lightweight plastic material, being formed in two half-housings that are easily opened for initial assembly or for servicing of the simple power unit and of the valve mechanism contained therein. Not only is the unit easy to assemble and service but, due to the fact that the only part of the interior of the unit that is contacted by the condiment is a confined chamber near one end, the unit can be quickly and effectively cleaned.

Accordingly an object of the invention is to provide a dispensing unit that is extremely simple in construction and easy to operate to discharge fixed, predetermined amounts of condiment.

DESCRIPTION OF THE DRAWINGS

FIG. 1 is a side elevation of the dispensing device of the present invention.
FIG. 2 is a section taken on line 2—2 of FIG. 1.
FIG. 3 is a section taken on line 3—3 of FIG. 2.
FIG. 4 is a section taken on line 4—4 of FIG. 2.
FIG. 5 is a section taken on line 5—5 of FIG. 2.

DESCRIPTION OF A PREFERRED EMBODIMENT

In FIGS. 1 and 2 the reference numeral 10 indicates a condiment gun constructed in accordance with the present invention. In the preferred embodiment, the gun is made of polypropylene. It will be understood that it could be made of stainless steel, a plastic other than polypropylene, or any other material that has been approved for food handling uses. The gun is a relatively small, lightweight device, the housing having a width W, (FIG. 1) of about 1¼″ and a length L of approximately 9 inches. The housing is made in two pieces 12 and 13 connected by a hinge 14. In the illustrated embodiment the hinge 14 is molded as an integral part of both of the half-housing members 12 and 13, the thickness of the hinge and its flexibility permitting it to act as a hinge and allow the housing members 12 and 13 to be separated and moved to an open position and then returned to the closed condition.

With a few minor exceptions, the housing members 12 and 13 are identical except that they are mirror images of each other. A description of the half-housing member 12 will serve to disclose the structure of member 13 also. The housing member 12 has a barrel section 12a, a handle section 12b, and a connecting section 12c. At the discharge end of the gun, the half-housing section 12a is generally semi-cylindrical in cross-section as seen in FIG. 3 with a flange 16 extending outwardly from one side. Ribs 17 and 18 (FIG. 2), which are integrally formed with the housing member and extend transversely thereof, have semi-cylindrical recesses 17a and 18a respectively. Recess 17a receives the piston rod 19 of a power cylinder 20 while recess 18a receives the barrel of the cylinder. Above the rib 18, the half-housing barrel section 12a is elongate in cross-section and includes arcuate wall portions 21a and 21b connected by a straight portion 21c (FIG. 4). Ribs 22 and 23 extend inwardly from the wall of the housing in this area and are provided with semi-cylindrical recesses which receive the barrel of cylinder 20. In the handle section 12b of the gun and in the connecting section 12c, the member 12 has curved wall portions 25a and 25b connected by a straight section 25c (FIG. 6). Intermediate the length of the handle section, the walls 25a and 25b are reinforced by walls portions 25d and 25e respectively, and walls 25a, 25d and 25e are provided with semi-cylindrical recesses 26a and 26e, respectively, to receive cylindrical portions of an air valve assembly 28. Three holes 30, 31 and 32 extend through the flat side walls of housing member 12 at spaced points to receive fastening bolts (not shown) which are inserted through corresponding holes in the housing member 13 to lock the two housing members together. Similarly, two adjacent flanges 16 of the members 12 and 13 are provided with holes 33–35 to receive fastening bolts.

An O-ring cord 38 is disposed in an elongate semi-cylindrical recess 39 in the flange 16 of member 12 and in the rib 17.

At the outer end of the barrel section of the gun, the housing member 12a has a reduced diameter semi-cylindrical portion 42 which provides a shoulder 42a. A cylindrical opening 44 extends entirely through the housing member, and a tubular portion 45a of an elbow connection 45 (FIG. 1) is disposed therein, as by an adhesive.

A semi-cylindrical metering chamber is defined in the member 12a between the shoulder 42a and the transverse rib 17, and a cylindrical piston 47, which is secured on the end of piston rod 19, reciprocates in the chamber between the shoulder 42a and the lower end of a cylindrical spacer tube 49 disposed in the chamber between the piston and the rib 17. A rubber O-ring 50 is disposed in a peripheral groove of the piston in yieldable sealing engagement with the inner wall of member 12a.

The power cylinder 20 is double-acting, being supplied at one end with air under pressure through a flexible tubular conduit 55 and at the other end by means of a conduit 56. The conduits 55 and 56 are connected into opposite ends of the housing of the valve 28 while a supply conduit 57 is connected into a central section of the valve. The supply conduit extends through the wall of the connecting section 12c of the housing and communicates with a conduit 58 leading to a source of air under pressure.

The valve 28 is of the type which has a valving element (not shown) that is slidable longitudinally in the housing of the valve. The valving element is moved in one direction when a trigger 60, to which the element is connected, is moved inwardly of the housing by the operator against the resistance of a spring in the housing. When the trigger is moved inwardly, the valving element is moved to a position establishing flow communication between the supply conduit 57 and conduit 55, while venting conduit 56 to atmosphere. The piston 50 is then moved toward the discharge end of the gun to force material, in the chamber in front of it, out of the gun. When the trigger is released by the operator, the internal valve spring moves the trigger outwardly of the valve housing and shifts the valving element longitudinally to a position wherein the supply conduit 57 is in flow communication with the conduit 56 and the conduit 55 is vented to atmosphere. When pressurized fluid enters the end of cylinder 20 through conduit 56, the piston 47 is moved rearwardly in the metering chamber until it contacts the spacer tube 49.

A condiment, such as catsup, is delivered to the chamber in front of the piston through a flexible plastic conduit 70 (FIG. 1) which is connected into the elbow 45 by means of a quick-disconnect coupling 73. The supply conduit 70 extends through support loops 71 and 72 formed on housing member 12, and is connected at its other end to a pump and reservoir system that maintains a supply of the condiment under a very small positive pressure, as for example, 5 pounds per square inch.

The gun is assembled by inserting the valve 28, the cylinder 20, the conduits 55, 56 and 57 connected between the valve and the cylinder, the spacer tube 49 and the O-ring cord 38 in the housing half 12 with these members resting in their assigned recesses. The air supply conduit 58 is connected to a quick-disconnect fitting 64 in the wall of the housing member. The housing half 13 is then pivoted about hinge 14 into place opposite the member 12, and bolts or the like are inserted through the aligned holes 30–35 of the housing members and fastened down to secure the housing members together.

It will be noted that, when the two housing halves are secured together, the dispensing chamber, which is the only area of the gun that receives the condiment, is substantially sealed off by the O-ring cord 38, the piston 47 and the side of the housing that is closed by the hinge 14.

A diffuser cap 65, which is made of yieldable plastic and has a snap-on connection at 66 with the lower end of the assembled housing, is positioned on the housing. The cap 65 has a relatively thin, central, slightly-conical wall that comes to an apex at 68 and four cuts (not shown) extend through the wall, intersecting at the apex to provide eight flaps which will yield to permit the condiment to be moved through the cap under the urging of the piston.

As mentioned above, the housing half-sections 12 and 13 are substantially identical. The differences can be easily seen by reference to FIGS. 1 and 2. In general, section 13 is identical to section 12 except that it does not have the structure for supporting the condiment inlet conduit 70 and the aperture 44 for receiving the fitting tube 45a. Similarly section 13 does not have as large an opening as section 12 for receiving the connector 64 of the air inlet hose.

In operation, when the piston 47 is moved away from the discharge end of the gun, condiment enters and fills the chamber in front of the piston. It will be evident that the size of the charge of condiment in the chamber depends upon how far the piston is retracted, and this depends upon the length of the spacer tube 49. Since the tube is replaceable, the gun can be quickly and easily adapted for discharging different size charges. For example, a range of tubes can be provided so that charges of condiment ranging from ⅛ ounce to 1 ounce can be made.

With this gun, the operator will know exactly how much material is going to be discharged and he can then concentrate his efforts on distributing the material in an appropriate pattern on the food he is processing. At the end of a shift or any other time, as when it is necessary to change the type of condiment being dispensed, the gun can be cleaned and sanitized without opening it up merely by disconnecting the supply line 70 from the gun at connector 72, connecting to the elbow 45 a conduit leading from a cleaning solution to cause the solution to enter the metering chamber, and then repeatedly actuating the trigger to cause the piston to discharge the cleaning liquid from the cylinder.

From the foregoing description it will be apparent that the present invention provides a condiment dispensing tool that is simple in construction, and easy to assemble. The provision of a replaceable spacer tube makes it particularly easy to adapt the gun for dispensing charges of condiment of different sizes, and the unique use of the O-ring cord provides a simple effective way to seal off the dispensing chamber.

I claim as my invention:

1. A dispensing device for dispensing condiment in partially liquid form comprising:
   a housing including a handle section and an elongated dispensing section;
   means in said housing defining a chamber having a discharge opening, said chamber being disposed in said dispensing section near one end thereof, and said discharge opening being located at said one end, said chamber defining means including an abutment member at the end of the chamber opposite said discharge opening;
   a plunger mounted for reciprocation in said chamber;
   spacer means disposed in said chamber between said abutment member and said plunger to limit the movement of said plunger toward said abutment member and thereby determine the condiment receiving volume of said chamber;
   means for delivering a charge of condiment into that portion of the chamber located between said plunger and the discharge opening; and
   means for actuating said plunger to discharge substantially all of the condiment contained within said chamber.

2. A dispensing device according to claim 1 wherein the chamber is a cylinder, said plunger is a piston reciprocable in said cylinder, and said actuating means is a power cylinder mounted in said housing.

3. A dispensing device according to claim 2 wherein said housing is formed into two half-housing members which are mirror images of each other, said device further including means for supporting said power cylinder in fixed position in said housing.

4. The dispensing device of claim 3 wherein said two half-housing members are formed from a plastic material and are connected by a hinge that is an integral part of each member.

5. The device of claim 3 wherein said housing is formed of a plastic material and each of said half-housing members includes integrally-formed inwardly extending walls adapted to receive and support said power cylinder in said housing, and means for securing said half-housing members together in face-to-face abutment with said cylinder locked between said housing members.

6. A dispensing device according to claim 1 wherein said housing is molded from plastic into two half-housing members which are mirror-images of each other, said members having opposed internal support walls adapted to support said plunger for reciprocation in said housing.

7. The device of claim 1 wherein said housing includes a passage extending through a side wall thereof and communicating with the chamber at a point between the discharge opening and said abutment member, said device further including means for supplying condiment in partially liquid form to said chamber through the passage at a small positive pressure.

* * * * *